(12) United States Patent
Shaty

(10) Patent No.: US 8,635,536 B2
(45) Date of Patent: Jan. 21, 2014

(54) THIRD-PARTY-SECURED ZONES ON WEB PAGES

(75) Inventor: Shachar Shaty, Rishon Le Zion (IL)

(73) Assignee: D&B Business Information Solutions Limited, Dublin (IE)

( * ) Notice: Subject to any disclaimer, the term of this patent is extended or adjusted under 35 U.S.C. 154(b) by 8 days.

(21) Appl. No.: 13/272,533

(22) Filed: Oct. 13, 2011

(65) Prior Publication Data

US 2012/0030732 A1  Feb. 2, 2012

Related U.S. Application Data

(63) Continuation of application No. 12/760,919, filed on Apr. 15, 2010, which is a continuation-in-part of application No. PCT/IL2008/001358, filed on Oct. 12, 2008, which is a continuation-in-part of application No. 11/974,833, filed on Oct. 16, 2007.

(51) Int. Cl.
*G06F 21/20* (2006.01)

(52) U.S. Cl.
USPC ........... 715/741; 715/736; 715/208; 715/760; 726/3; 726/4

(58) Field of Classification Search
USPC ................... 715/208, 760, 741, 736; 726/3, 4
See application file for complete search history.

(56) References Cited

U.S. PATENT DOCUMENTS

| | | | |
|---|---|---|---|
| 5,841,970 A | 11/1998 | Tabuki | |
| 5,892,904 A | 4/1999 | Atkinson et al. | |
| 6,023,764 A | 2/2000 | Curtis | |
| 6,029,245 A | 2/2000 | Scanlan | |
| 6,247,133 B1 | 6/2001 | Palage et al. | |
| 6,587,880 B1 | 7/2003 | Saigo et al. | |
| 6,658,394 B1 | 12/2003 | Khaishgi et al. | |
| 7,020,634 B2 | 3/2006 | Khaishgi et al. | |
| 7,092,912 B2 | 8/2006 | Khaishgi et al. | |
| 7,100,049 B2 | 8/2006 | Gasparini et al. | |
| 7,114,177 B2 | 9/2006 | Rosenberg et al. | |

(Continued)

FOREIGN PATENT DOCUMENTS

| | | |
|---|---|---|
| EP | 1159683 | 12/2001 |
| GB | 2359904 | 9/2001 |
| WO | WO00/46681 | 8/2000 |
| WO | WO2009/050704 | 4/2009 |

OTHER PUBLICATIONS

Verisign Secure Site Seal, www.verisign.com/prg/seal/install.htm, 1999.

(Continued)

*Primary Examiner* — Andrea Leggett
(74) *Attorney, Agent, or Firm* — Ohlandt, Greeley, Ruggiero & Perle L.L.P.

(57) ABSTRACT

There is provided a method that includes storing a plurality of image elements of a seal media object in respective files in an authentication server system, each of the image elements is selected from the group consisting of: a layer of the seal media object, a still image portion of the seal media object, and a moving image portion of the seal media object. Authenticating at least a portion of a web page, upon opening of the web page in a browser, by the authentication server system. Delivering to the browser, by the authentication server system, files for assembly and display of the image elements on the web page as the seal media object upon authenticating.

32 Claims, 9 Drawing Sheets

(56) References Cited

U.S. PATENT DOCUMENTS 7,739,512 B2 6/2010 Hawkes
2006/0277477 A1* 12/2006 Christenson ................ 715/760
2007/0240230 A1* 10/2007 O'Connell et al. ............ 726/28

OTHER PUBLICATIONS

Rosenberg, et al., "True SiteTM: Helping on-line companies create trusted brands so their site visitors feel confident enough to stay and play," GeoTrust, Nov. 2001.

Raggett, D. et al., IFrames are specified in HTML 4.01 specification, W3C Recommendation, Dec. 1999.
BBBOnLine ® Reliability and Privacy Seal Programs, 2010.
International Preliminary Examination Report dated Apr. 21, 2010 corresponding to International Patent Application No. PCT/IL08/01358.
International Search Report dated Mar. 11, 2010 corresponding to International Patent Application No. PCT/IL08/01358.
USPTO Office Action mailed Dec. 10, 2010 corresponding to U.S. Appl. No. 11/974,833.

* cited by examiner

THIRD-PARTY-SECURED ZONES ON WEB PAGES

CROSS-REFERENCE TO RELATED APPLICATIONS

The present application is a continuation of U.S. application Ser. No. 12/760,919, filed Apr. 15, 2010, which is a continuation-in-part of International Application PCT IL2008/001358, filed Oct. 12, 2008, which claims priority from, and is a continuation-in-part of, U.S. application Ser. No. 11/974,833, filed Oct. 16, 2007, entitled, "Third-party-secured zones on web pages," all of which are assigned to the assignee of the present application and are incorporated herein by reference.

BACKGROUND

1. Field of the Disclosure

The present disclosure relates to generally to web page content provided by third parties, and more specifically to third-party-secured web page communication.

2. Description of the Related Art

Web pages often display content provided by third-party servers. Various HTML elements are used to provide such content. For example, the HTML tag <WG SRC . . . > often includes a fully-qualified uniform resource locator (URL) that causes the browser to retrieve and display a graphical image hosted by a third-party server, i.e., a server other than that which is hosting the main web page.

The serving of advertisements, such as banner ads, is one common application of such third-party provisioning of content. To display a web page including third-party-supplied advertising, a web browser first loads HTML content from the server hosting the web page. The HTML content typically includes an indication of the third-party location of the advertising, and, typically, an associated link to the advertiser's website. The browser typically executes a request to the third-party advertising host, which provides in return the media object(s) associated with the advertisement. The browser displays the media object(s) at the appropriate location on the web page A number of organizations issue online seals to web sites that meet certain criteria, such as a certain level of reliability, maintenance of privacy of personal information, or adherence to business practices. Participating websites display a seal issued by the certification organization. For example, the Council of Better Business Bureau, Inc. operates the BBBOn-Line® Reliability and Privacy Seal Programs. The BBBOn-Line Reliability Seal confirms that a company is a member of its local Better Business Bureau, has been reviewed to meet truth in advertisement guidelines, and follows good customer service practices. Similarly, the non-profit TRUSTe™ organization issues an electronic seal image to organizations that adhere to TRUSTe's established privacy principles and that agree to comply with the TRUSTe oversight and watchdog consumer dispute resolution process. VeriSign, Inc. (Mountain View, Calif.) provides the VeriSign Secured™ Seal to sites that are protected by a VeriSign SSL certificate.

In order to prevent fraudulent use of their seals, most organizations enable the online user to verify the authenticity of the seal. Minimally, clicking on the seal opens a web page served by the organization, which indicates whether the website displaying the seal has been authorized to do so. More sophisticated techniques for preventing fraudulent display of seals have been developed. For example, GeoTrust, Inc. (Needham, Mass.) provides seals that include a live time/date stamp, and/or the name of the company displaying the seal. For example, techniques for displaying and confirming the authenticity of a seal are described in U.S. Pat. No. 7,114,177 to Rosenberg et al., which is assigned to GeoTrust and is incorporated herein by reference, and in a white paper by Rosenberg et al., entitled "True Site™: Helping on-line companies create trusted brands so their site visitors feel confident enough to stay and pay," GeoTrust (November 2001), which is incorporated herein by reference. U.S. Pat. No. 6,658,394 to Khaishgi et al., which is incorporated herein by reference, also describes techniques for issuing electronic seals of certification to online entities.

The following references may be of interest: U.S. Pat. No. 6,587,880 to Saigo et al., US Patent Application Publication 2006/0277477 to Christenson, US Patent Application Publication 2007/0240230 to O'Connell et al, US Patent Application Publication 2009/0100505 to Shaty, and PCT Publication 2009/050704 to Shaty

SUMMARY

In some embodiments of the present disclosure, a trusted third-party server creates a secure zone on a verified web page, and presents content in the zone to a user who is visiting the verified web page. The secure zone enables secure communication between the user's browser and the third-party server. The third-party server typically uses the zone for presenting web content, and/or for performing secure web-based applications, such as secure login or secure client-to-client transactions or communication. For some applications, the web content includes a verification seal. The third-party server is operated by a trusted third-party service provider, which verifies websites or portions thereof before allowing the use of the secure zone In some embodiments of the present disclosure, the secure zone comprises an inline frame, such as an HTML IFrame or an XFRAME, which the trusted third-party server creates, controls, and populates with web content. Upon verifying at least one uniform resource locator (URL) of a website or a portion thereof, the third-party service provider issues a unique identification code to an entity, such as a corporate business entity, associated with the URL, and provides a zone script for placement on web pages identified by the URL. When a user opens a web page which includes the zone script, execution of the zone script triggers the execution of a program at the third-party server of the third-party provider. Upon authenticating that the URL has been verified, the program creates an inline frame on the web page, and delivers web content to or via the frame (for example, the program may present the web content in the frame). The program authenticates the URL by retrieving the referrer address (a URL) of the web page from a session between the inline frame and the third-party server, and checking whether this address is contained in a list of verified URLs maintained by the third-party provider. Optionally, the third-party server stores an identifier of the session for subsequent interaction between the user and the third-party server via the secure zone.

In some embodiments of the present disclosure, the entity's unique identification code is not passed to the user at any point during the creation of the secure zone, display of content in the zone, and subsequent secure communication between the user's browser and the third-party server. Furthermore, the code for placement on the web page typically contains no information specific to the entity or URL. The same code is thus generally placed on web pages identified by a plurality of different URLs controlled by different entities.

In some embodiments of the present disclosure, the third-party service provider comprises a seal issuer, which enables a web page identified by a verified URL to display a verification seal that is difficult to forge or misuse. Upon creating a secure zone on the web page, as described above, the third-party server presents, in or via the frame, a media object representing the seal. The seal server stores an identifier of the session between the frame and the seal server, for subsequent re-authentication of the user by the third-party server. In some embodiments of the present disclosure, a method is provided for providing a profile including authentication information and verified information regarding the entity (e.g., the corporate business entity) controlling the verified URL. When a user clicks on the seal, the seal server re-authenticates the user by checking whether the user is the same user previously associated with the session during which the seal was displayed in the inline frame. If so, the seal server opens a new window in the user's browser, and presents the verified information regarding the entity associated with the URL, and information that enables the user to confirm the authenticity of the seal and the information displayed.

In some embodiments of the present disclosure, the third-party service provider provides a login service in the secure zone. Login information (e.g., username and password) entered by the user is transmitted directly to the third-party server. Upon successful verification of the login information, the third-party delivers, to or via the secure zone, web content available only to logged-in users.

In some embodiments of the present disclosure, the third-party service provider provides a secure communication service in the secure zone. A first user uses a first secure zone on a first web page to send information to a second user, who retrieves the information via a second secure zone typically on a second web page.

In some embodiments of the present disclosure, a web page displays a plurality of identifiers of entities (e.g., corporate business entities) in association with respective secure zones. The third-party service provider uses each of the secure zones for presenting web content specific to each respective entity. Each secure zone comprises an inline frame that specifies a unique identification code of the associated entity. The third-party service provider receives and uses the unique identification codes to authenticate each of the entities. Upon authentication, the central services server delivers web content to or via the secure zone.

In some embodiments of the present disclosure, techniques are provided for increasing the difficulty of copying the verification seal image by the user of the browser, in order to improve the security of the verification system. The verification seal image is divided into image elements, such as layers and/or portions of the seal image, which are stored in respective files. Upon authentication of at least a portion of the web page, the third-party server delivers the files to or via the frame. HTML elements of the frame cause the browser to reassemble the image elements and construct the seal image on the fly.

Typically, the files of the image elements of the seal image are saved using arbitrary file names, which do not provide any indication that the files are related to the seal image. Thus, if the files of the image elements are downloaded to the cache (such as in Windows® operating systems), the user cannot easily identify that the files are related to the seal image. Even if the user succeeds in identifying the relevant image files, how to assemble the elements to create the full seal will not be readily apparent to the user, because the file names do not provide information regarding the positional relationship of the elements with one another in the complete seal image. For some applications, the seal image is divided into a large number of elements, such that in practice it is nearly impossible to reconstruct the seal from the elements. The images of the elements are quite small, making it difficult for the user to identify that the image files are related to the seal image, even if the user were to view the image files. For some applications, the top layer of the seal image is a transparent layer. If the user attempts to drag and drop the seal (e.g., onto the desktop), only this transparent layer is saved to user's computer. The user cannot drag and drop the rest of the layers and/or portions of the seal image.

There is therefore provided, in accordance with an embodiment of the present disclosure, a computer-implemented method including: storing, in an authentication server system, a URL identifying at least one web page; providing a secure zone browser-side script to be placed on the web page; upon opening of the web page in a browser, triggering, by the secure zone browser-side script, execution of a server-side script at the authentication server system; creating on the web page, by the server-side script, an inline frame, which is controlled by the authentication server system during a session that is associated with the inline frame; retrieving, by the authentication server system, a referrer address from the session; comparing, by the authentication server system, the referrer address with the stored URL; and upon finding a match between the referrer address and the stored URL, delivering, by the authentication server system, web content to or via the inline frame.

In an embodiment of the present disclosure, the web content includes a seal media object, and delivering the web content includes presenting the seal media object in or via the inline frame.

For some applications, storing the URL includes storing the URL in association with verification information in the authentication server system, and further including: upon finding the match between the referrer address and the stored URL, storing, by the authentication server system, an identifier of the session; receiving an indication at the authentication server system that at least a portion of the seal media object has been activated by a user requesting the verification information; responsively to the indication, authenticating, by the authentication server system, using the stored identifier of the session, that the seal media object has been activated in the session; and responsively to the authenticating, presenting, by the authentication server system, the verification information to the user, in or via the inline frame.

In an embodiment of the present disclosure, the URL includes a first URL, the web page includes a first web page, storing the URL includes storing the first URL and a second URL identifying at least one second web page, and providing the secure zone browser-side script includes providing the same secure zone browser-side script to be placed on the first web page and on the second web page In an embodiment of the present disclosure, the inline frame includes an HTML IFrame, and creating the inline frame includes creating the HTML IFrame on the web page In an embodiment of the present disclosure, the method further includes, upon finding the match between the referrer address and the stored URL, storing, by the authentication server system, an identifier of the session. For some applications, the method further includes: receiving an indication at the authentication server system of an interaction of a user with the web content delivered to or via the inline frame; responsively to the indication, authenticating, by the authentication server system, using the stored identifier of the session, that the interaction occurred in the session; and responsively to the authenticating, performing, by the authentication server system, at least one step selected from the group consisting of: modifying at least a portion of the web content delivered to or via the inline frame, presenting information in the inline frame, and presenting information in a window of the browser opened via the inline frame.

The identifier of the session may include a random key, and storing the identifier of the session includes storing the random key in an object that represents the session. Alternatively or additionally, storing the identifier of the session includes retrieving a session ID from an object that represents the session. Further alternatively or additionally, storing the URL includes assigning an entity ID to an entity associated with the URL, and storing the identifier of the session includes storing the entity ID. Typically, the method does not include communicating the entity ID to the browser.

Alternatively or additionally, storing the identifier of the session includes retrieving and storing an IP address of the browser.

In an embodiment of the present disclosure, the web content includes login controls, and the method further includes: receiving at the authentication server system login information entered by a user using the login controls; authenticating the login information by the authentication server system; and delivering, by the authentication server system, restricted-access content to or via the inline frame In an embodiment of the present disclosure, the URL includes a first URL, the web page includes a first web page, and the inline frame includes a first inline frame, the web content includes first web content including transmission controls, storing the URL includes storing the first URL and a second URL, which identifies a second web page, creating further includes creating, on the second web page, a second inline frame, delivering the web content further includes delivering, to or via the second inline frame, second web content including receipt controls, and the method further includes sending, via the authentication server system, by a first user of the first website, using the transmission controls, information to a second user of the second website; and receiving the information by the second user, using the receipt controls.

For some applications, the web content includes streaming content, and delivering the web content includes leaving the inline frame open while delivering the streaming content.

There is further provided, in accordance with an embodiment of the present disclosure, apparatus including: an interface for communicating with a browser over a network; a memory, configured to store a URL identifying at least one web page having thereon a secure zone browser-side script; and a processor, configured to execute a server-side script triggered by the secure zone browser-side script upon opening of the web page in the browser, which server¬side script causes the processor to create on the web page an inline frame, which is controlled by the processor during a session that is associated with the inline frame, and the processor is configured to retrieve a referrer address from the session, compare the referrer address with the stored URL, and upon finding a match between the referrer address and the stored URL, deliver web content to or via the inline frame via the interface.

There is still further provided, in accordance with an embodiment of the present disclosure, a non-transitory computer-readable medium in which program instructions are stored, which instructions, when read by a computer, cause the computer to store a URL identifying at least one web page having thereon a secure zone browser-side script, and execute a server-side script triggered by the secure zone browser-side script upon opening of the web page in a browser, which server-side script causes the computer to create on the web page an inline frame, which is controlled by the computer during a session that is associated with the inline frame, and the instructions, when read by the computer, cause the computer to retrieve a referrer address from the session, compare the referrer address with the stored URL, and upon finding a match between the referrer address and the stored URL, deliver web content to or via the inline frame.

There is additionally provided, in accordance with an embodiment of the present disclosure, a computer-implemented method including: storing, in an authentication server system, a plurality of unique identification codes assigned to respective entities; providing a plurality of secure zone HTML code elements to be placed on a web page in association with respective identifiers of the entities, the HTML code elements specifying respective ones of the unique identification codes for the respective associated identifiers of the entities, and the HTML code elements specifying creation of respective inline frames on the web page; upon opening of the web page in a browser, triggering execution of a server-side program at the authentication server system, which program receives the unique identification codes specified by the code elements; authenticating the received unique identification codes by comparing the received unique identification codes to the unique identification codes stored in the authentication server system; and for each match found between one of the received unique identification codes and one of the stored unique identification codes, delivering, by the authentication server system, web content to or via the one of the inline frames associated with the one of the received unique identification codes.

In an embodiment, authenticating the received unique identification codes further includes storing, in the authentication server system, a URL identifying the web page, retrieving, by the authentication server system, a referrer address of the web page, and comparing, by the authentication server system, the referrer address with the stored URL, and delivering the web content includes delivering the web content only if the referrer address is identical to the stored URL.

In an embodiment, the web content includes a seal media object, and delivering the web content includes presenting the seal media object in or via the one of the inline frames.

For some applications, presenting the seal media object includes storing, in respective files, a plurality of image elements of the seal media object, each of the image elements selected from the group consisting of: a layer of the seal media object, a still image portion of the seal media object, and a moving image portion of the seal media object; and delivering to the browser, by the authentication server system, the files for assembly and display of the image elements on the web page as the seal media object. For some applications, each of at least two of the image elements of the seal media object is selected from the group consisting of: the still image portion of the seal media object, and the moving image portion of the seal media object. For some applications, at least two of the image elements of the seal media object are respective layers of the seal media object. For some applications, one of the image elements is a transparent top layer.

In an embodiment, the method further includes storing by the authentication server system, for each match found, an identifier of a session that is associated with the associated one of the inline frames.

For some applications, the method further includes receiving an indication at the authentication server system of an interaction of a user with the web content delivered to or via the one of the inline frames; responsively to the indication, authenticating, by the authentication server system, using the stored identifier of the session, that the interaction occurred in the session; and, responsively to the authenticating, performing, by the authentication server system, at least one step selected from the group consisting of: modifying at least a portion of the web content delivered to or via the one of the inline frames, presenting information in the one of the inline frames, and presenting information in a window of the browser opened via the one of the inline frames.

For some applications, the web content includes login controls, and the method further includes receiving, at the authentication server system, login information entered by a user using the login controls; authenticating the login information by the authentication server system; and delivering, by the authentication server system, restricted-access web content to or via the one of the inline frames.

There is yet additionally provided, in accordance with an embodiment of the present disclosure, apparatus including: an interface for communicating with a browser over a network; a memory, configured to store a plurality of unique identification codes assigned to respective entities, and to store a URL identifying at least one web page having thereon a plurality of secure zone HTML code elements placed in association with respective identifiers of the entities, the HTML code elements specifying respective ones of the unique identification codes for the respective associated identifiers of the entities, and the HTML code elements specifying creation of respective inline frames on the web page; and a processor, configured to execute, upon opening of a web page in the browser, a server-side program that receives the unique identification codes specified by the code elements, to authenticate the received unique identification codes by comparing the received unique identification codes to the unique identification codes stored in the memory, and, for each match found between one of the received unique identification codes and one of the stored unique identification codes, to deliver, via the interface, web content to or via the one of the inline frames associated with the one of the received unique identification codes.

In an embodiment, the processor is configured to further authenticate the received unique identification codes by retrieving a referrer address of the web page, and comparing the referrer address with the stored URL; and deliver the web content only if the referrer address is identical to the stored URL.

In an embodiment, the web content includes a seal media object, and the processor is configured to deliver the web content by presenting the seal media object in or via the one of the inline frames via the interface.

For some applications, the processor is configured to present the seal media object by storing a plurality of elements of the seal media object, each of the elements selected from the group consisting of: a layer of the seal media object, a still image portion of the seal media object, and a moving image portion of the seal media object; and delivering the elements of the seal media object for reassembly and display by the browser on the web page as the seal media object.

In an embodiment, the processor is configured to store, for each match found, an identifier of a session that is associated with the associated one of the inline frames. For some applications, the processor is configured to receive an indication of an interaction of a user with the web content delivered to or via the one of the inline frames; responsively to the indication, authenticate, using the stored identifier of the session, that the interaction occurred in the session; and, responsively to the authenticating, perform at least one action selected from the group consisting of: modifying at least a portion of the web content delivered to or via the one of the inline frames, presenting information in the one of the inline frames, and presenting information in a window of the browser opened via the one of the inline frames.

For some applications, the web content includes login controls, and the processor is configured to receive login information entered by a user using the login controls, authenticate the login information, and delivering restricted-access web content to or via the one of the inline frames.

There is also provided, in accordance with an embodiment of the present disclosure, a non-transitory computer-readable medium in which program instructions are stored, which instructions, when read by a computer, cause the computer to store a plurality of unique identification codes assigned to respective entities; to store a URL identifying at least one web page having thereon a plurality of secure zone HTML code elements placed in association with respective identifiers of the entities, the HTML code elements specifying respective ones of the unique identification codes for the respective associated identifiers of the entities, and the HTML code elements specifying creation of respective inline frames on the web page; to execute, upon opening of a web page in a browser, a server-side program that receives the unique identification codes specified by the code elements; to authenticate the received unique identification codes by comparing the received unique identification codes to the stored unique identification codes; and, for each match found between one of the received unique identification codes and one of the stored unique identification codes, to deliver web content to or via the one of the inline frames associated with the one of the received unique identification codes.

There is further provided, in accordance with an application of the present disclosure, a computer-implemented method including: storing, in respective files in an authentication server system, a plurality of image elements of a seal media object, each of the image elements selected from the group consisting of: a layer of the seal media object, a still image portion of the seal media object, and a moving image portion of the seal media object; upon opening of a web page in a browser, authenticating, by the authentication server system, at least a portion of the web page; and upon authenticating, delivering to the browser, by the authentication server system, the files for assembly and display of the image elements on the web page as the seal media object.

For some applications, each of at least two of the image elements of the seal media object is selected from the group consisting of: the still image portion of the seal media object, and the moving image portion of the seal media object. Alternatively or additionally, at least two of the image elements of the seal media object are respective layers of the seal media object. For some applications, one of the image elements is a transparent top layer, which, optionally, may be entirely transparent.

For some applications, delivering the files includes delivering, by the authentication server system to the browser, a plurality of HTML elements specifying the image elements of the seal media object, respectively. For some applications, delivering the HTML elements includes delivering HTML code which includes the HTML elements, and which specifies positions on the web page of the image elements with respect to one another. For some applications, storing the plurality of image elements includes storing the image elements at respective network locations, and saving the element network locations in respective array elements of an array, and the HTML elements specify the respective array elements of the array.

For some applications, storing the files includes storing the files at respective network locations.

For some applications, authenticating includes authenticating the web page by: storing, in the authentication server system, a web page URL identifying the web page, upon the opening of the web page in the browser, receiving, by the authentication server system, a referrer address associated with the web page, comparing, by the authentication server system, the referrer address with the stored URL, and finding the web page to be authentic responsively to finding a match between the referrer address and the stored web page URL.

For some applications, delivering the files includes: providing a secure zone browser-side script to be placed on the web page; upon the opening of the web page in the browser, triggering, by the secure zone browser-side script, execution of a server-side script at the authentication server system; creating on the web page, by the server-side script, an inline frame, which is controlled by the authentication server system during a session that is associated with the inline frame; retrieving, by the authentication server system, a referrer address from the session; and delivering, by the authentication server system, the files to or via the inline frame.

For some applications, the inline frame includes an HTML IFrame, and creating the inline frame includes creating the HTML IFrame on the web page.

For some applications, authenticating includes authenticating the portion of the web page by: storing, in the authentication server system, a plurality of unique identification codes assigned to respective entities, providing a plurality of secure zone HTML code elements to be placed on the web page in association with respective identifiers of the entities, the HTML code elements specifying respective ones of the unique identification codes for the respective associated identifiers of the entities, and the HTML code elements specifying creation of respective inline frames on the web page, upon the opening of the web page in a browser, triggering execution of a server-side program at the authentication server system, which program receives the unique identification codes specified by the code elements, authenticating the received unique identification codes by comparing the received unique identification codes to the unique identification codes stored in the authentication server system, and finding the portion of the web page to be authentic responsively to finding one or more matches between one of the received unique identification codes and one of the stored unique identification codes, and delivering includes delivering, by the authentication server system, the files to or via one or more of the inline frames associated with one or more of the received unique identification codes.

There is still further provided, in accordance with an application of the present disclosure, apparatus including: an interface for communicating with a browser over a network; a memory, configured to store, in respective files, a plurality of image elements of a seal media object, each of the image elements selected from the group consisting of: a layer of the seal media object, and an image portion of the seal media object; and a processor, configured to authenticate, upon opening of a web page in the browser, at least a portion of the web page, and upon authenticating, to deliver, to the browser via the interface, the files for assembly and display of the image elements on the web page as the seal media object.

There is additionally provided, in accordance with an application of the present disclosure, a non-transitory computer-readable medium in which program instructions are stored, which instructions, when read by a computer, cause the computer to store, in respective files, a plurality of image elements of a seal media object, each of the image elements selected from the group consisting of: a layer of the seal media object, a still image portion of the seal media object, and a moving image portion of the seal media object; upon opening of a web page in a browser, to authenticate at least a portion of the web page; and, upon authenticating, to deliver, to the browser, the files for assembly and display of the image elements on the web page as the seal media object.

Additionally, a method is provided that includes storing a plurality of image elements of a seal media object in respective files in an authentication server system, each of the image elements is selected from the group consisting of: a layer of the seal media object, a still image portion of the seal media object, and a moving image portion of the seal media object. The method further includes authenticating at least a portion of a web page, upon opening of the web page in a browser, by the authentication server system; and delivering to the browser, by the authentication server system, files for assembly and display of the image elements on the web page as the seal media object upon authenticating.

An apparatus is provided that includes an interface for communicating with a browser over a network, a memory and a processor. The memory stores a plurality of image elements of a seal media object in respective files, wherein each of the image elements is selected from the group consisting of: a layer of the seal media object, a still image portion of the seal media object, and a moving image portion of the seal media object. The processor executes program instructions, the program instructions cause the processor to authenticate at least a portion of the web page upon opening of a web page in the browser and deliver the files for assembly and display of the image elements on the web page as the seal media object to the browser via the interface, upon authenticating.

A non-tangible computer readable medium is provided that includes instructions. The instructions, when read by a computer, cause the computer to store a plurality of image elements of a seal media object in respective files, each of the image elements is selected from the group consisting of: a layer of the seal media object, a still image portion of the seal media object, and a moving image portion of the seal media object. The instructions, when read by the computer, further cause the computer to authenticate at least a portion of the web page upon opening of a web page in a browser and deliver to the browser the files for assembly and display of the image elements on the web page as the seal media object upon authenticating.

The present disclosure will be more fully understood from the following detailed description of embodiments thereof, taken together with the drawings and claims provided herewith.

DESCRIPTION OF EMBODIMENTS

Figure 1:
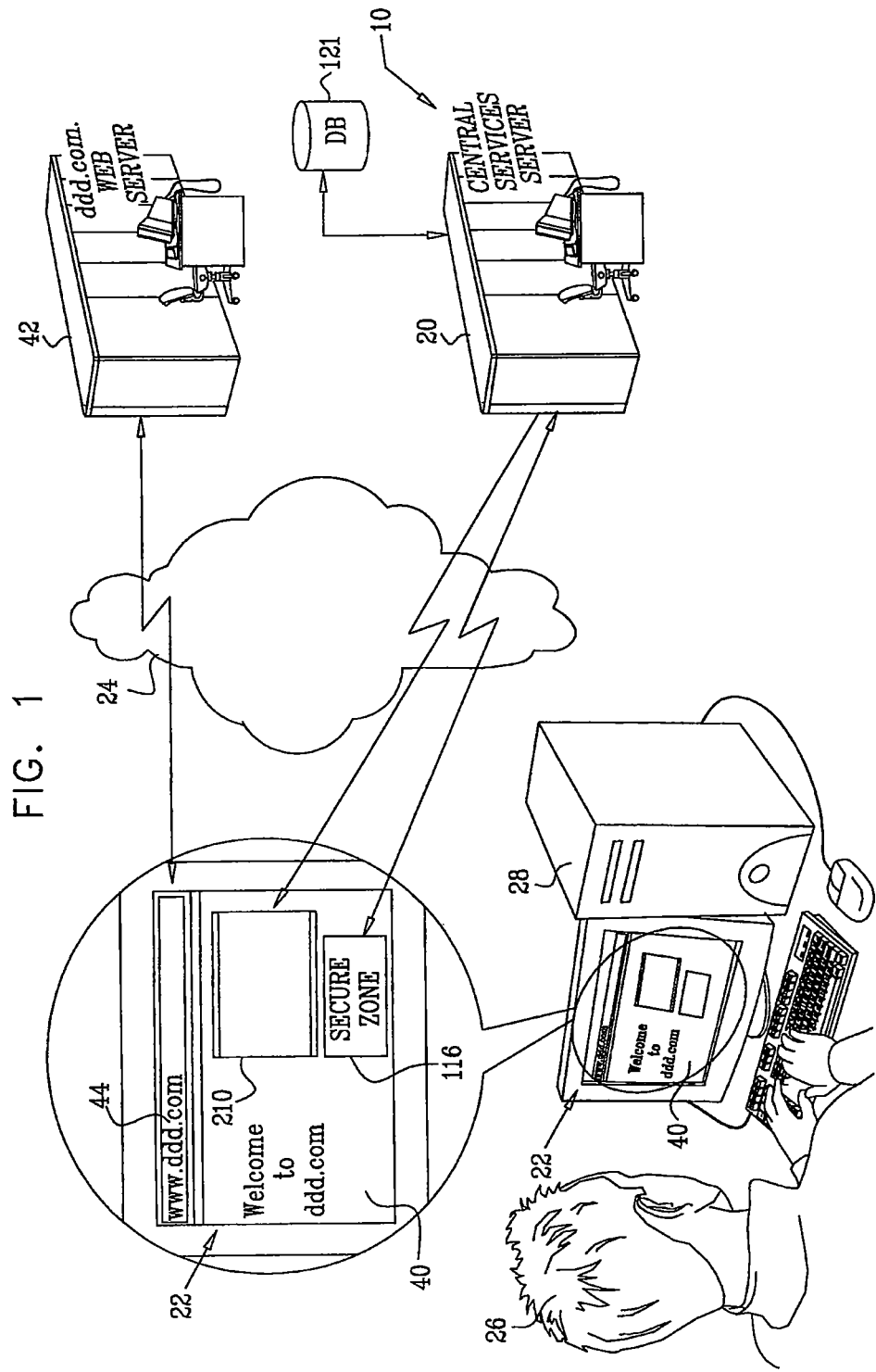
FIG. 1 is a schematic, pictorial illustration showing a secure zone system, in accordance with an embodiment of the present disclosure.

FIG. 1 is a schematic, pictorial illustration showing a secure zone system 10, in accordance with an embodiment of the present disclosure. System 10 comprises a central services server 20, which comprises a Web server that communicates with a Web browser 22 over a wide area network (WAN) 24, such as the Internet. A user 26 operates the Web browser, which is typically implemented using conventional browser software running on a personal computer or workstation 28, as is known in the art Central services server 20 typically comprises at least one general-purpose computer workstation, having a processor, an interface with WAN 24, and, optionally, a user interface. Software for carrying out the process management functions of central services server 20 may be provided to the server in electronic form, over a network, for example, or it may alternatively be furnished on tangible media, such as optical, magnetic or electronic memory media. Central services server 20 comprises web serving functionality, which is typically provided by a web server that runs on the same workstation that provides the other functionality of server 20 described herein, or runs on a separate server or workstation. The Web serving functionality of system 10 may be distributed over a plurality of Web servers, as is known in the art.

In an embodiment of the present disclosure, a third-party service provider operates system 10. The service provider verifies a plurality of uniform resource locators (URLs) (web sites or portions of websites). For example, the service provider may verify a URL including a domain name of a website including a plurality of web pages, such as, for example, "www.ddd.com" or one or more URLs within a domain name, such as all web pages identified by URLs which begin with "www.ddd.comlstore". The websites are typically operated by entities not otherwise legally affiliated with the third-party service provider. Typically, the verification includes verifying a relationship between an entity and the URL. To perform such verification, the third-party service provider' typically verifies that the URL is associated with the entity, and/or information regarding the website and/or the operator of the website, such as the legal identity, credentials, policies, and/or business practices of the operator of the website. The third-party service provider typically stores the URL in association with verification information, such as information regarding the entity, e.g., a profile of the entity. The third-party service provider typically issues a unique identification code to the entity.

Figure 2:
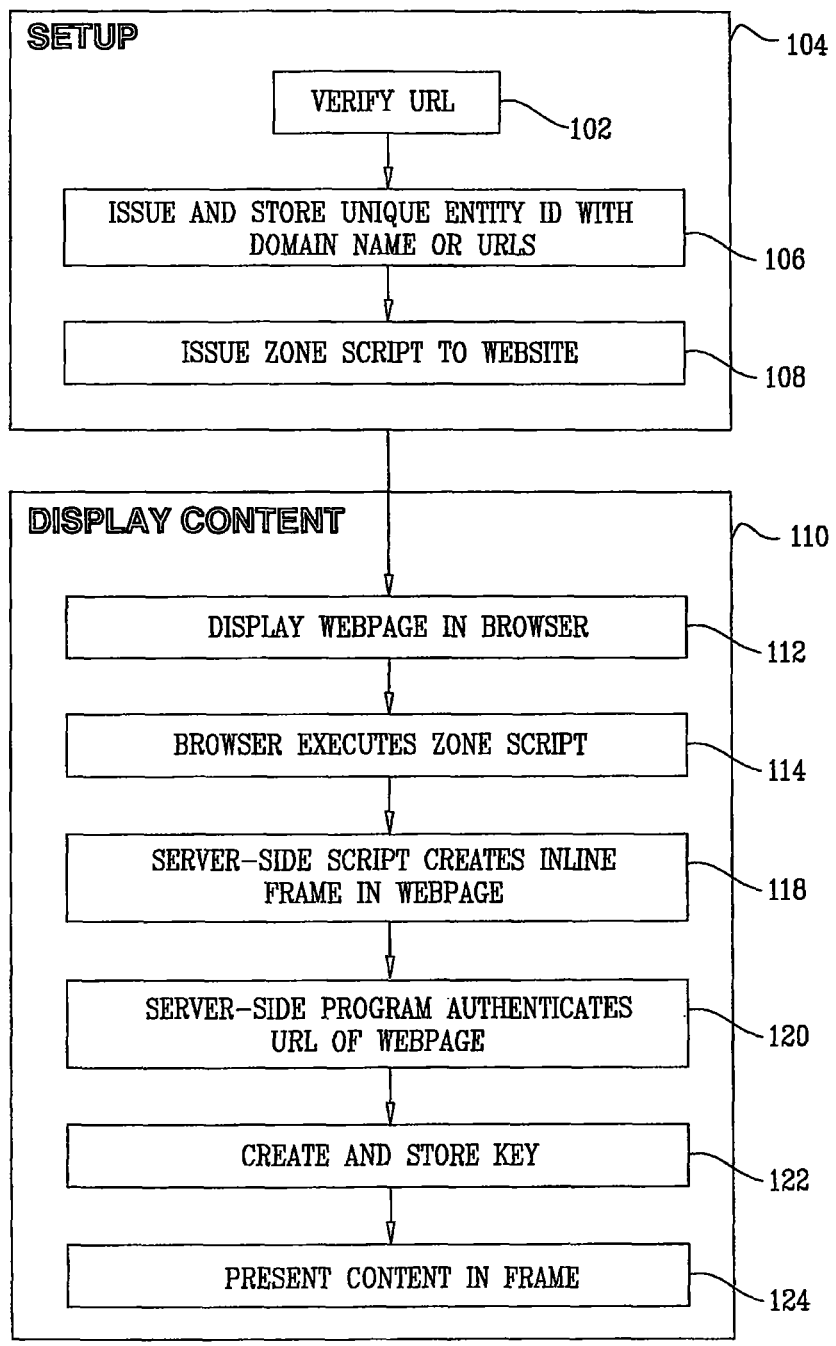
FIG. 2 is a flow chart that schematically illustrates a method for displaying web content in a secure zone of a web page, in accordance with an embodiment of the present disclosure

Reference is made to FIG. 2, which is a flow chart that schematically illustrates a method 100 for seamless authentication of a URL and presenting web content in a secure zone on a web page, in accordance with an embodiment of the present disclosure. As shown in FIG. 1, an operator of a website hosts at least one web page 40 of the website on at least one Web server 42. The web page has a URL 44, such as the exemplary domain name "www.ddd.com" shown in the figure. Web server 42 communicates with browser 22 over WAN 24. Method 100 enables the display of web content, typically HTML content, within web page 40 or another window in browser 22. The web content may comprise, for example, graphical content, text content, streaming media content, audio content, other media content, or other objects supported by HTML or browsers, such as user controls, Microsoft® ActiveX controls, and/or Java™ applets, which may provide static or dynamic information, and/or enable interaction with the user. For some applications, the web content is delivered by a party external to both the operator of the website and the third-party service provider, such as advertisements or news. The information may be sent using protocols such as RSS or other online streaming protocols.

At a website verification step 102 during a setup portion 104 of method 100, the third-party service provider verifies at least one characteristic of URL 44, such as an association between the URL and an entity controlling the URL, such as described hereinabove. Upon verifying the URL, the third-party service provider issues a unique identification code to the entity controlling the URL (an "entity ID"), and stores the entity ID and information regarding the identify, in association with the URL, in one or more databases of system 10, at an issue and store entity ID step 106. The service provider provides a secure zone script for placement on web page 40, at a zone code issuance step 108. For some applications, the zone is visible on the web page, in which case the zone script is generally placed on, web page 40 at a desired location for displaying the web content. For other applications, the zone is invisible, and may display content, for example, by causing the opening of an additional window in the browser.

During a display portion 110 of method 100, user 26 opens web page 40 in browser 22, at a display web page step 112. The opening of the web page in the browser causes the browser to execute the zone script included in the web page, at a zone script execution step 114. Execution of the zone script by the browser triggers the execution of a server-side script at central services server 20 (FIG. 1) of the third¬party service provider. The zone script typically is written in a client-side scripting language, such as JavaScript or VBScript. For example, the zone code may include the following JavaScript code:

---

LISTING 1

```
<script language="JavaScript"
src= "http://www.tpstaging.com/Jscripts/TpSecureZone.js"
type = <"text/javascript"></script>
```

---

The server-side script creates an inline frame 116 (FIG. 1), such as an HTML IFrame, at the location of the zone code on web page 40, at a frame creation step 118. An IFrame is an HTML element that enables the embedding of another HTML document inside a main document. IFrames are specified in HTML 4.01 Specification, W3C Recommendation 24 Dec. 1999, which is incorporated herein by reference. Alternatively, web page 40, itself, includes an HTML element that creates the inline frame, which is populated by server-side code called by the zone script.

The use of an inline frame enables central services server 20 to set up a direct connection (which is typically secure) with web page 40, i.e., not via Web server 42 that is serving web page 40 outside of the frame. As a result, central services server 20 has direct and exclusive control over the section of web page 40 occupied by inline frame 116. Creation of the inline frame causes the web serving functionality of central services server 20 to create a session between the inline frame and central services server 20. For example, the web serving functionality may place a cookie on the computer in which the browser is running in order to maintain the session, as is known in the art. (Although browser- and server-side scripts are generally described in the present application, including in the claims, as executing various processes, it is to be understood that associated computer processors actually execute these various processes responsively to software instructions contained in the scripts.

After creating the inline frame, the server-side script calls a server-side program running on central services server 20, which performs the remainder of the steps of display portion 110 of method 100. Alternatively, the server-side script itself performs all or a portion of these remaining steps.

The server-side script is written in a server-side scripting language, such as JavaScript or VBScript. The name and location of the server-side script is indicated by the zone code (in the exemplary code above, by the SRC attribute). The server-side script, for example, may include the following JavaScript code:

LISTING 2

```
document.write("<iframe id='Iframe.1'
src=.http://www.tpstaging.com/TpSecureZone.aspx.
width='130px' height='90px' frameborder='0'
scrolling='no' ></iframe>");
```

At a website authentication step 120, the server-Side program authenticates that a web address of web page 40 (URL 44) is registered with central services server 20. The server-side program determines the URL by retrieving the referrer address from the session of the inline frame, for example using the HTTP_REFERER variable, and checks whether the web address was registered at step 106 above. It is noted that at no point during this authentication process is any client- or website¬ specific data transferred over the Internet in a decipherable way.

For some applications, after authenticating the web address, the server-side program stores an identifier of the session between the inline frame and the central services server. For some applications, the identifier comprises: a session key, which comprises: (a) a random, unique value, (b) optionally, the entity ID, and, optionally, (c) the IP address of the browser 22 client (retrieved using the REMOTE_ADDR variable), and stores the key as a record in a data repository 121 (e.g., one or more tables, or a relational database) stored on or in communication with central services server 20, at a key creation and storage step 122.

For some applications, the server-side program also stores the session key in the session between the inline frame and the central services server. For example, the server-side program may use a Microsoft® Active Server Pages (ASP) Session Object for this purpose (e.g., using the statement "Session ["Key"]=Createkandomkey( );"). For some applications, central services server 20 uses this stored key at step 202 of method 200, described herein-below with reference to FIG. 4. The use of the session key obviates any need to send the entity ID to browser 22 throughout the content serving processes described herein.

Alternatively, for some applications, rather than creating a random value for storage in the key at step 122 above, the server-side program retrieves the ASP Session ID automatically created when the session between the inline frame and the central services server was created, and includes this value in the key. For these applications, the server-side program does not necessarily store the key in the Session Object, because the Session Object already includes the ASP Session ID which is used later at step 202 of method 200 to confirm the identity of the session. For applications in which the server-side program uses a server-side scripting language other than ASP that supports sessions, the server-side program retrieves the session ID from these sessions At a web content presentation step 124, the server-side program delivers web content to inline frame 116 or via inline frame 116 (e.g., by opening a new window in the browser via the inline frame), thereby concluding display portion 110 of method 100. The inline frame session typically, but not necessarily, remains open after delivering the content. For some applications, such as when the web content includes streaming content, the inline frame is left open for displaying the content.

Figure 3:
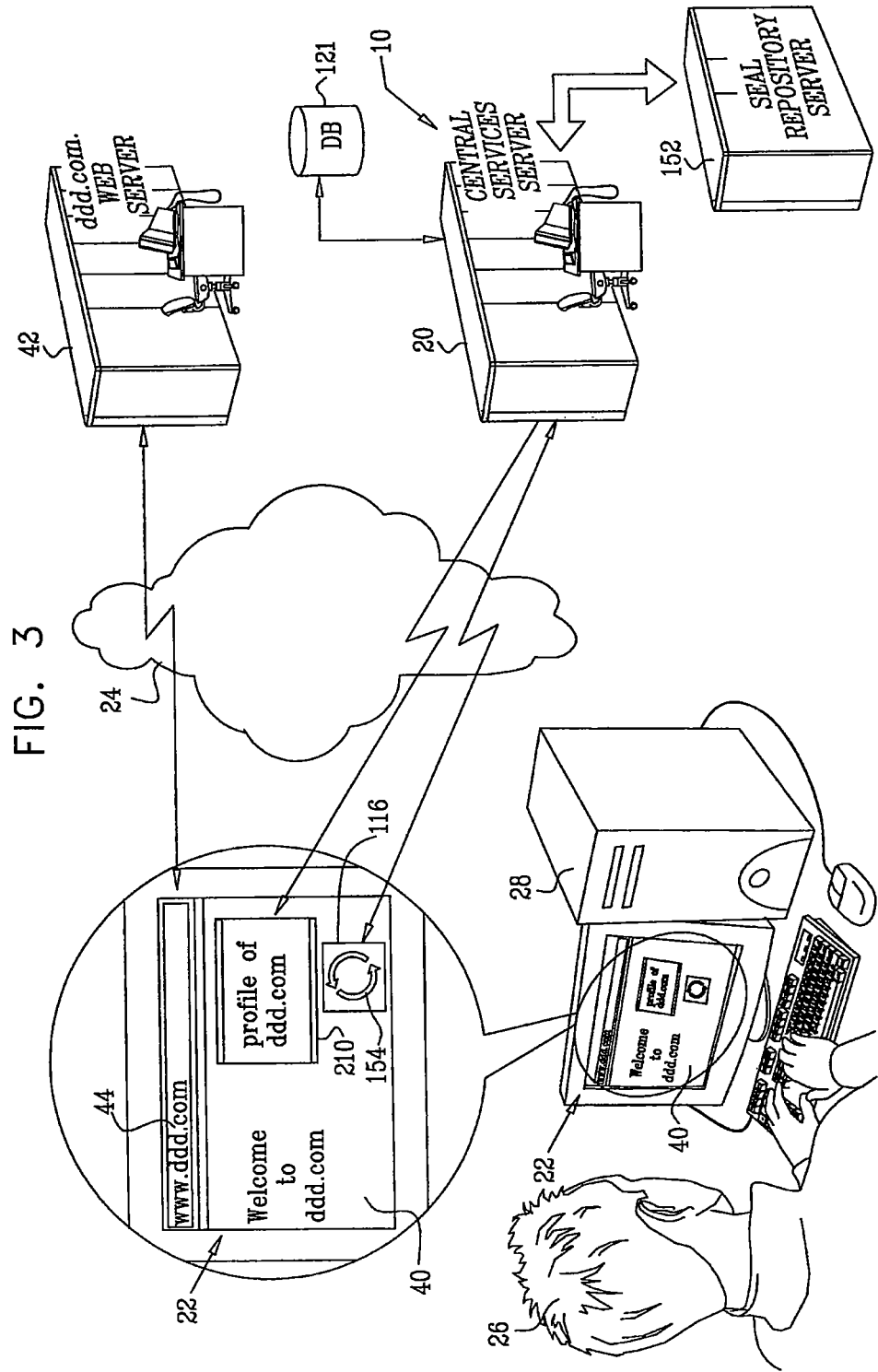
FIG. 3 is a schematic, pictorial illustration showing a verification seal system, in accordance with an embodiment of the present disclosure

Reference is made to FIG. 3, which is a schematic, pictorial illustration showing an authentication seal system 150, in accordance with an embodiment of the present disclosure. Authentication seal system 150 represents one implementation of secure zone system 10, described hereinabove with reference to FIGS. 1 and 2. In addition to the elements of system 10, authentication seal system 150 comprises at least one seal repository server 152, which may run on a separate workstation, as shown in FIG. 1, or on the same workstation on which central services server 20 runs (configuration not shown). Each seal repository server 152 comprises at least one general-purpose computer workstation, having a processor and at least one interface. Seal repository server 152 is typically protected by a firewall. For some applications, system 150 comprises separate seal repository servers 152 for different geographic regions, such as different countries.

In an embodiment of the present disclosure, to display an authentication seal in the secure zone defined by inline frame 116, the third-party service provider and authentication seal system 150 use method 100, described hereinabove with reference to FIG. 2, modified as follows. Upon authenticating a website, or a portion thereof, at authentication step 102, the third-party service provider typically also stores additional certification information regarding the website and/or its operator, such as described hereinabove, in seal repository server 152, for display during a seal verification procedure, as described herein-below with reference to FIG. 4. For some applications, at key creation and storage step 122, the server-side program stores the session key in seal repository 152. At web content presentation step 124, the server-side program populates inline frame 116 with a seal media object 154. For some applications, the server-side program delivers the seal media object using the techniques described herein-below with reference to FIGS. 9 and/or 10.

Figure 4:
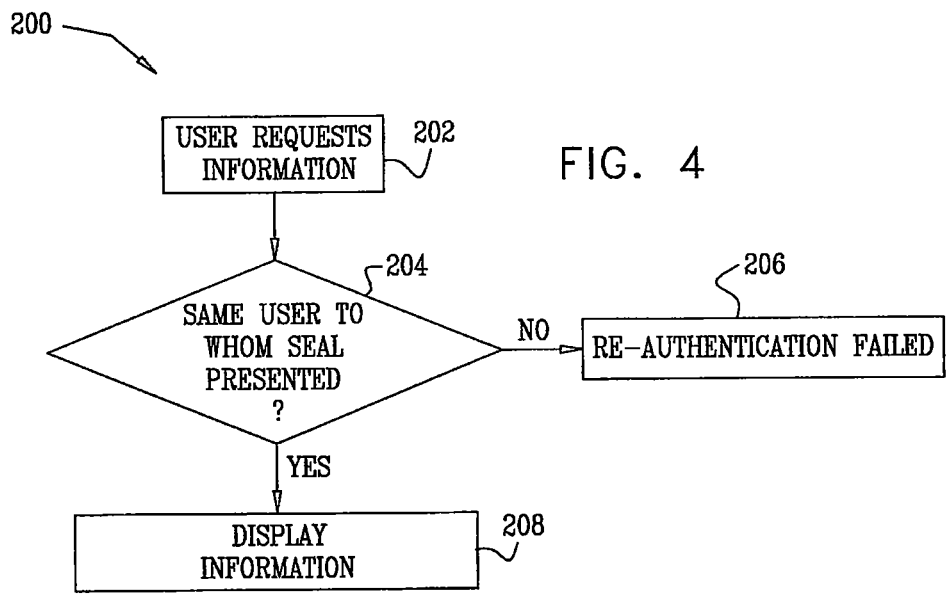
FIG. 4 is a flow chart that schematically illustrates a method for providing a profile including verified information, in accordance with an embodiment of the present disclosure.

Reference is made to FIG. 4, which is a flow chart that schematically illustrates a method 200 for providing a profile including verified information, in accordance with an embodiment of the present disclosure. Method 200 begins when a user requests information regarding the entity associated with the URL, by activating at least a portion of media object 154, typically by clicking on it, at a request information step 202. At a user re-authentication check step 204, central services server 20 checks whether the user is the same user 26 previously associated with the inline frame session created by central services server 20 at step 118 of method 100, described with reference to FIGS. 2 and 3 hereinabove.

For some applications, to perform this re-authentication check the central services server constructs an authentication key that comprises:

the random value stored at step 122 of method 100 above, which is now retrieved by the central services server from the Session Object. If the information-requesting user is the same as user 26 to whom the seal was displayed at step 124 of method 100 above, the same inline frame session continues, so the same random value is retrieved that was earlier stored. If, on the other hand, the information-requesting user is any user other than user 26, or the session has timed out, the server is not able to retrieve the same random value, because the information-requesting user has a different session from the session created for user 26. Alternatively, for applications in which the server¬ side program does not create a random key at step 122 of method 100 of FIG. 2, the authentication key comprises the Session ID, rather than the random value;

optionally, the entity ID; and optionally, the IP address of the browser 22 client (retrieved using the REMOTE_ADDR variable).

The central services server attempts to look up this authentication key in the data repository 121 in which the key was stored at step 122 of method 100 above (which, as mentioned, for some applications is stored in seal repository server 152). If there is no match in the database between this random value-IP combination and one of the keys stored earlier, re-authentication of the user fails, at a failed verification step 206. For example, the information-requesting user may be trying to spoof the user 26, or the session may have timed out. Typically, the central services server stores the IP address of the failed information-verifying user for later analysis.

Alternatively, for applications in which the key created at step 122 of method 100 includes the ASP Session ID instead of a random value, as described hereinabove, the authentication key includes the ASP Session ill of the current session, rather than the value retrieved from the Session Object.

On the other hand, if the same user 26 is confirmed to be requesting information at check step 204, the entity ID of the key is returned from the database. At a verification information display step 208, central services server 20, or seal repository server 152, using the entity ill, retrieves additional information regarding the entity and/or the URL from seal repository server 152•,• and displays this information to user 24. This information is typically displayed in a pop-up window 210 opened for this purpose over the same open session, either at step 208 or prior thereto, such as at step 202, or, alternatively, by redirecting the window in which the zone is located.

In an embodiment of the present disclosure, the techniques of method 200, described hereinabove with reference to FIG. 4, are used for re-authenticating a user for applications other than presenting a seal, such as for other applications described herein.

Figure 5:
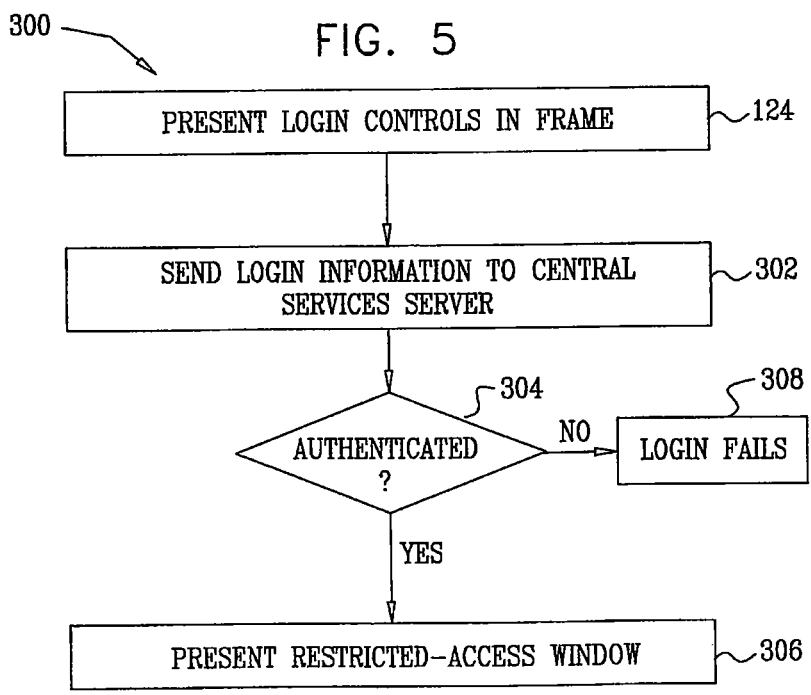
FIG. 5 is a flow chart that schematically illustrates a method for secure login, in accordance with an embodiment of the present disclosure.

Reference is made to FIG. 5, which is a flow chart that schematically illustrates a method 300 for secure login, in accordance with an embodiment of the present disclosure. Method 300 enables user 26 viewing web page 40 to securely log into a service or system offered by the third-party service provider, via the secure zone provided by inline frame 116. The method begins at content presentation step 124 of method 100 of FIG. 2, after the earlier steps of method 100 have been completed, such that inline frame 116 has been created on web page 40. At step 124 of method 100, the server-side program populates inline frame 116 with login controls, such as text boxes for entering a username and password, and other login-related information, such as login instructions. When the user submits the login information, the information is sent to central services server 20 for authentication, at a send information step 302. Server 20 checks whether the login information is correct, at an authentication check step 304. If the server finds that the login information is correct, the user is logged in, and the server delivers restricted-access web content to the user, to or via the inline frame, typically by redirecting the current active browser window, opening a new window in the browser, or populating the inline frame, at a restricted access window presentation step 306. If the login information is found to be incorrect, login fails, at a login failure step 308. For some applications, during the login process, such as when the user submits the login information, the third-party server re-authenticates the user, using the re-authentication techniques described hereinabove with reference to step 204 of method 200 of FIG. 4.

Figure 6:
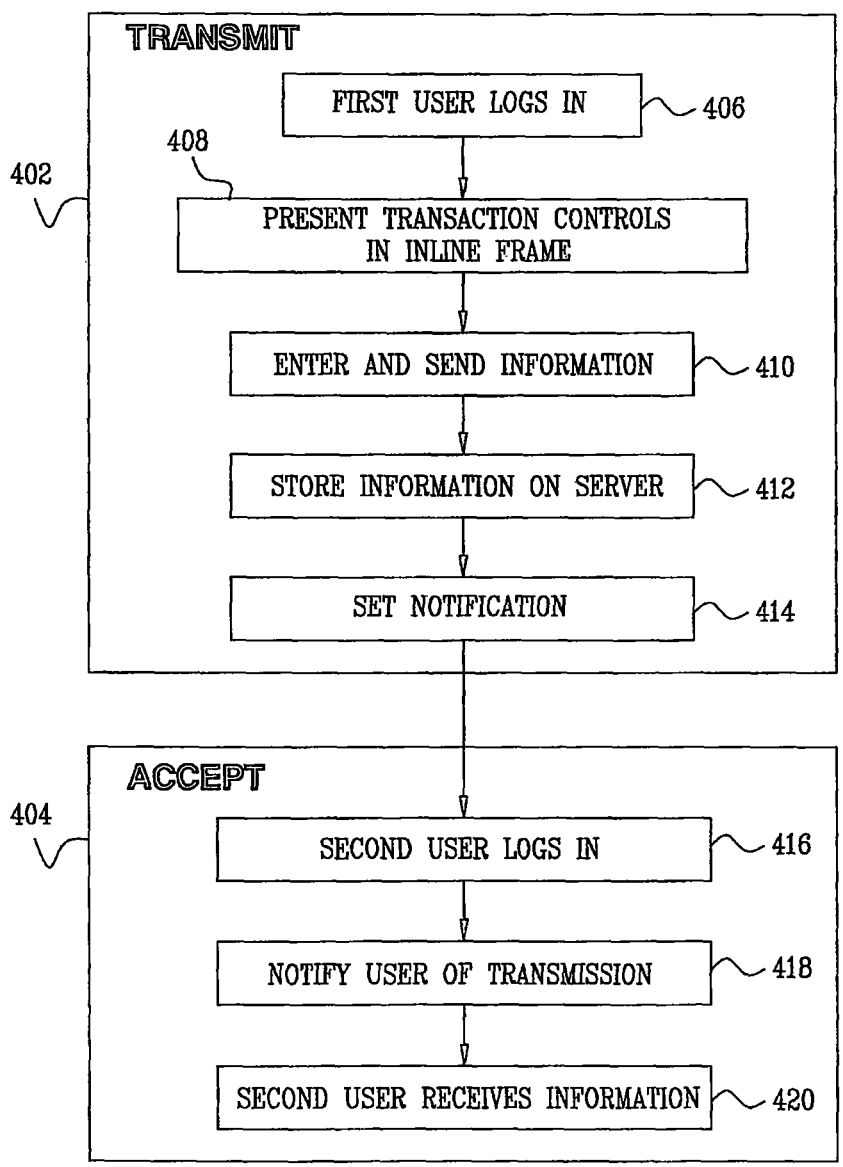
FIG. 6 is a flow chart that schematically illustrates a method for secure client-to-client transactions, in accordance with an embodiment of the present disclosure.

Reference is made to FIG. 6, which is a flow chart that schematically illustrates a method 400 for secure client-to-client transactions, in accordance with an embodiment of the present disclosure. Method 400 enables a first user 26 viewing web page 40 to securely transmit information to at least one second user 26, via the third-party service provider. Method 400 includes a transmit phase 402, followed by an accept phase 404. Transmit phase 402 optionally begins at a login step 406, at which first user 26 performs a secure login via inline frame 116, using method 300 described hereinabove with reference to FIG. 5. Alternatively, the transmit phase begins without secure login, after inline frame 116 has been created, as described hereinabove with reference to steps 102 through 122 of method 100 of FIG. 2.

At a transaction controls presentation step 408, the server-side program populates inline frame 116, or another window generated via the inline frame, with transaction controls that, for example, allow the first user to enter a message and/or select files for transmission. The transaction controls also enable the first user to enter a destination address, such as an alphanumeric user ID, and to give a send instruction. Using the controls in the inline frame, the user enters information (e.g., a message and/or one or more files), and sends the information, at a send information step 410. For some applications, during information sending process, such as when the user submits an indication to send the information, the third-party server re-authenticates the user, using the re-authentication techniques described hereinabove with reference to step 204 of method 200 of FIG. 4. Server 20 stores the transmitted information, at an information storage step 412. The server also sets a notification for the recipient, at a set notification step 414.

Accept phase 404 optionally begins at a login step 416, at which a second user 26 performs a secure login via inline frame 116, using method 300 described hereinabove with reference to FIG. 5. Alternatively, the accept phase begins without secure login, after inline frame 116 has been created, as described hereinabove with reference to steps 102 through 122 of method 100 of FIG. 2.

At a notification step 418, the server-side program populates inline frame 116, or another window generated via the inline frame, with a notification that the transmitted information has been sent. The second user selects the information for retrieval, such as viewing and/or downloading from server 20, at a receipt step 420. For some applications, during the information retrieval process, such as when the user submits a request for retrieval, the third-party server re-authenticates the user, using the re-authentication techniques described hereinabove with reference to step 204 of method 200 of FIG. 4.

For some applications, transmission of information is performed on an entity level, i.e., information is sent from a first entity (e.g., "www.ddd.com") to a second entity (e.g., "www.eee.com"), each of which has a unique ID. Typically, any user logged into the first entity can send information, and any user logged into the second, receiving entity can view and/or download the transmitted information.

For other applications, transmission of information is performed on a user level, i.e., information is sent from a first user to a second user, each of which has a unique user ID. Each user can log into any web page participating in the information transmission service offered by the third-party service provider.

For some applications, method 400 is used to enable client-to-client transactions beyond information exchange, such as trading or other business transactions. For these applications, the information communicated using the method relates to such transactions.

Figure 7:
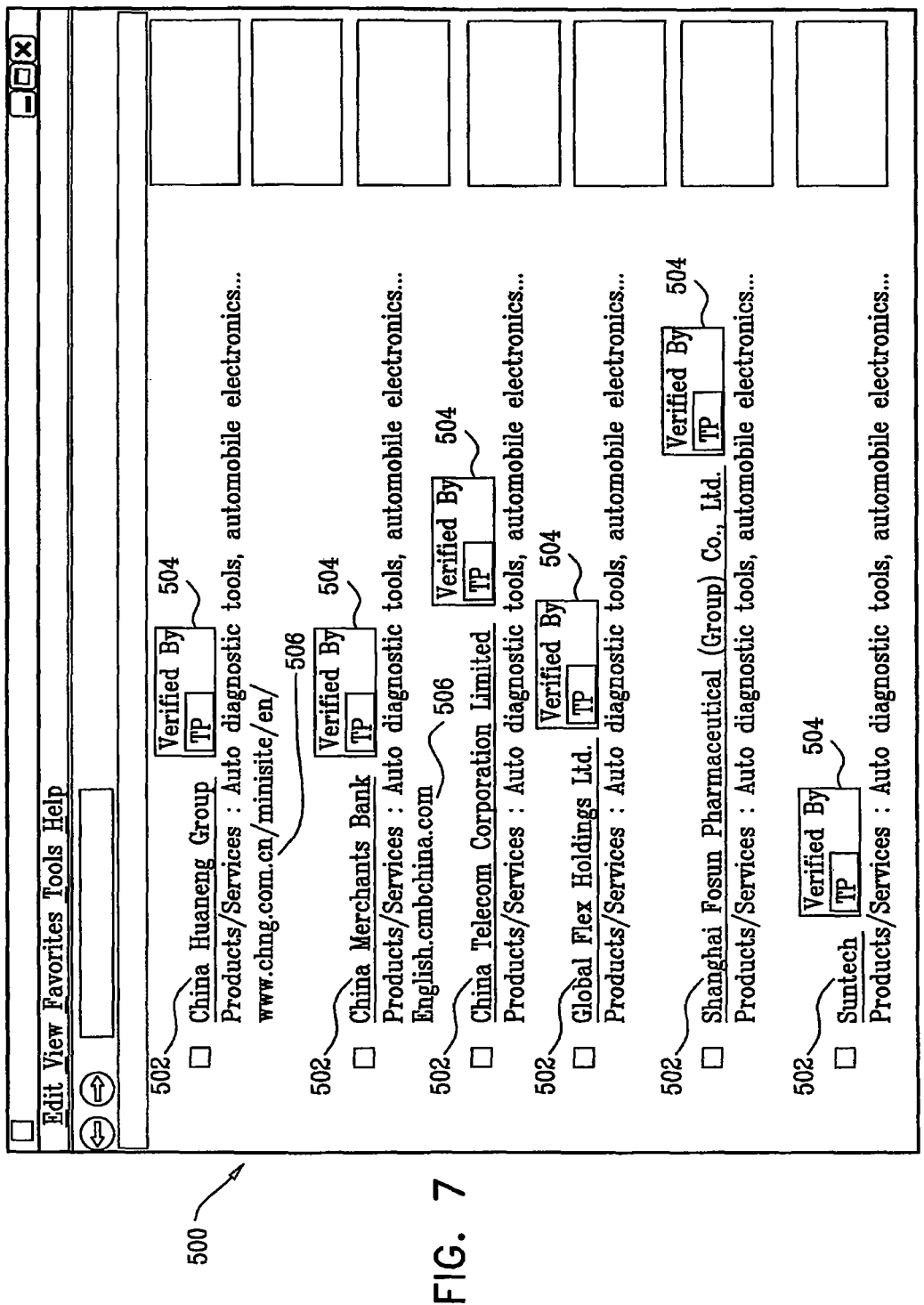
FIG. 7 is a schematic illustration of an exemplary screenshot of a web page that displays a plurality of identifiers of entities in association with respective secure zones, in accordance with an embodiment of the present disclosure.

FIG. 7 is a schematic illustration of an exemplary screenshot of a web page 500 that displays a plurality of identifiers 502 of entities in association with respective secure zones 504, in accordance with an embodiment of the present disclosure. For some applications, identifiers 502 comprise human-readable names of the entities (e.g., corporate business entities). Alternatively or additionally, the identifiers comprise hypertext URLs 506 that are associated with the entities: Generally, web page 500 is served by a web server whose operator is unaffiliated with the entities and unaffiliated with central services server 20. For some applications, central services server 20 uses each of secure zones 504 for presenting web content specific to each respective entity; Alternatively, the same content is presented in all or a portion of the secure zones. The third-party service provider operating central services server 20 issues a unique identification code to each of the entities. Alternatively, only a portion of the entities are issued identification codes, and secure zones 504 are displayed only for the entities having identification codes.

For some applications, web page 500 displays search results, which include respective hypertext URLs 506, each of which is associated with a respective one of the entities, for example, the entity that operates the web site or page associated with the URL: For other applications, web page 500 displays a list of identifiers of the entities (such as human-readable names of the entities), for example, to provide an online directory of the entities.

In some of the embodiments described hereinabove with reference to FIGS. 1-6, the same secure zone browser-side script is provided on a plurality of web pages. In these embodiments, central services server 20 identifies each of the web pages by retrieving its unique URL from the referrer address.

In contrast, in the present embodiment, a plurality of secure zones 504 are displayed on web page 500, which is identified by a single URL that is not directly associated with the entities displayed on web page 500. Central services server 20 thus cannot use the referrer address of web page 500 to identify the unique identification code of the entity associated with each secure zone. Instead, secure zones 504 are created by respective HTML code elements that specify the respective unique identification codes of the respective associated entities. Central services server 20 receives and uses the unique identification codes to authenticate that each of the entities is registered with the central services server. Upon authentication, the central services server delivers web content to or via the secure zone, such as described hereinabove with reference to step 124 of method 100 of FIG. 2. For some applications, the content is unique and/or customized for each entity, while for other applications, the same content is provided for a plurality of entities (e.g., a seal media object). For some applications, the central services server stores an identifier of a session between the secure zone and the central services server, as described hereinabove with reference to step 122 of method 100 of FIG. 2. The central services server may use this identifier for a re-authentication check before providing a profile including verified information, as described hereinabove with reference to FIG. 4. The web content delivered to or via: the secure zone may include any of the applications described hereinabove, such as with reference to FIGS. 3, 4, 5, and/or 6, for example, a seal media object, or transactions controls (e.g., for secure login).

For some applications, each of the HTML code elements comprises an inline frame 510, such as an HTML IFrame, which specifies as its content source a URL provided by central services server 20, and passes a parameter containing the unique identification code to central services server 20. The following exemplary HTML code element is for an entity having an identification code with the value "123," which is identified by the parameter "IdValue":

---
LISTING 3
---
```
<iframe
Src="http://www.tpsmartseal.com/listings.aspx?listType=200&ListArea=
10&IDType=2&IDValue=123"
Frameborder="0" width="20"height="20">
</iframe>
```
---

As explained above, this HTML code element appears a plurality of times on the search results web page, each time specifying a different identification code. The HTML code element triggers execution of a server-side script, which receives the unique identification code, and, responsively thereto, generates appropriate HTML code for presentation in the user's browser.

Figure 8:
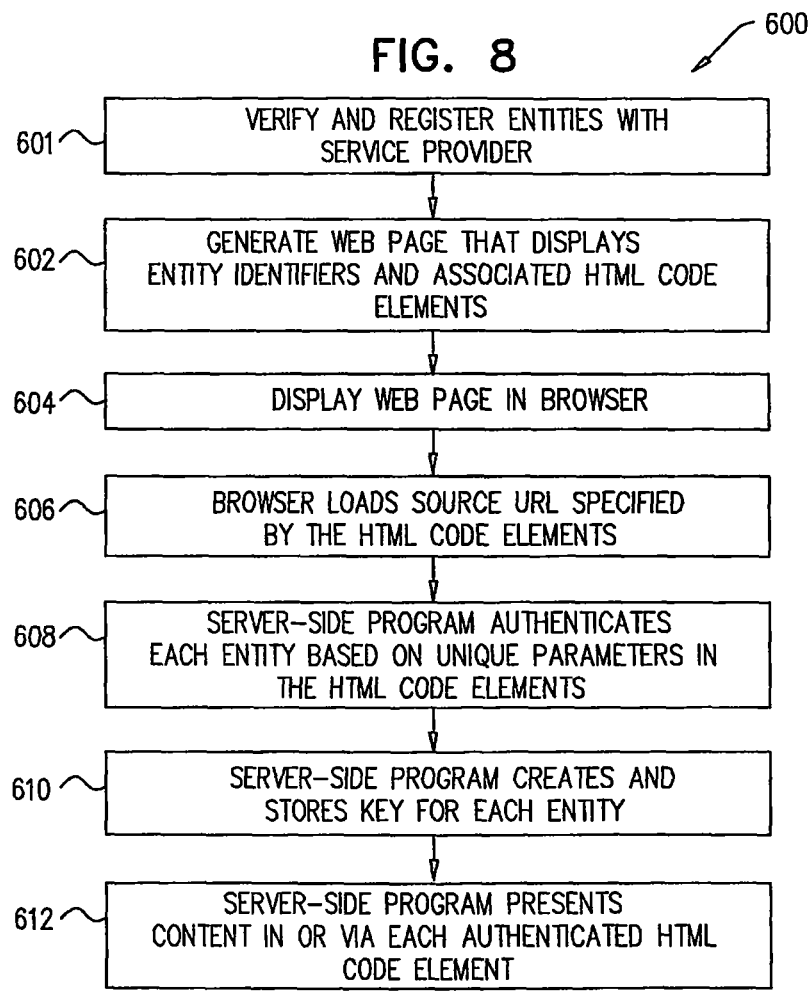
FIG. 8 is a flow chart that schematically illustrates a method for displaying identifiers of entities in association with respective secure zones, in accordance with an embodiment of the present disclosure.

Reference is made to FIG. 8, which is a flow chart that schematically illustrates a method 600 for displaying identifiers of entities in association with respective secure zones, in accordance with an embodiment of the present disclosure. Method 600 begins at a setup step 601, at which a third-party service provider verifies and registers the entities typically using the techniques described hereinabove with reference to setup portion 104 of method 100 of FIG. 2, mutatis mutandis. At a web page generation step 602, a web server generates a web page that displays a plurality of identifiers of entities (e.g., human-readable names of the entities), and, in association with each of the entity identifiers, an HTML code element, such as an HTML IFrame, which includes as a parameter a unique identification code for the entity. A user's web browser receives and displays the web page, at a display web page step 604. The browser loads the source URL specified by the HTML code elements, at a load source URL step 606. Loading the URL triggers execution of a server-side program, typically a script, by central services server 20. Typically, the plurality of HTML code elements specify the same source URL.

The server-side program separately authenticates each entity, using the unique identification code specified by each HTML code element, at an authentication step 608. To perform this authentication, the server-side program typically authenticates that the unique identification code is registered with central services server 20. Optionally, the server-side program further authenticates the entity by authenticating that a web address (such as one or more URLs) of the web page is registered with central services server 20. The server-side program determines the URL of the web page by retrieving the referrer address from the session of the inline frame, for example using the HTTP_REFERER variable, and checks whether the web address was registered. For some applications, server-side program checks whether the unique identification code was associated with the URL during registration.

For some applications, after authenticating the web address, the server-side program stores an identifier of the session between the inline frame and the central services server, at a key creation step 610. Typically, the server-side program uses techniques described hereinabove with reference to step 122 of method 100 of FIG. 2.

At a web content presentation step 612, the server-side program delivers web content (e.g., a seal media object) to or via each of the authenticated secure zones (e.g., by opening a new window in the browser via the inline frame). The inline frame session typically, but not necessarily, remains open after delivering the content. For some applications, such as when the web content includes streaming content, the inline frame is left open for displaying the content. For some applications, the server-side program delivers the seal media object using the techniques described hereinbelow with reference to FIGS. 9 and/or 10.

Figure 9:
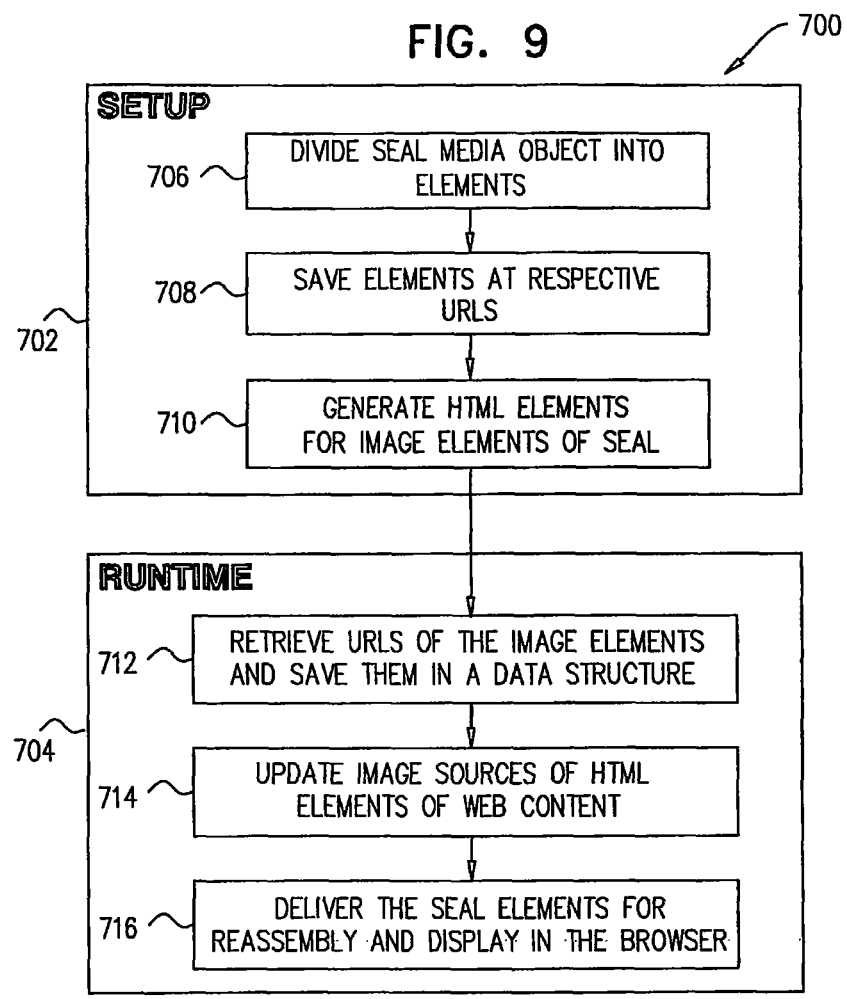
FIG. 9 is a flow chart that schematically illustrates a method for increasing the difficulty of copying a seal media object, in accordance with an embodiment of the present disclosure.

Reference is made to FIG. 9, which is a flow chart that schematically illustrates a method 700 for increasing the difficulty of copying seal media object 154, in accordance with an embodiment of the present disclosure. By increasing the difficulty of copying the seal media object by the user of the browser, method 700 improves the security of the verification system. For some applications, method 700 is performed in combination with the secure zone techniques described hereinabove with reference to FIGS. 1-6 and/or FIGS. 7-8. For other applications, method 700 is performed with other techniques for delivering seals, such as those described in the references incorporated by reference in the Background section, or otherwise known in the art; for these applications, the seals are typically not delivered to a secure zone.

Method 700 typically comprises a setup portion 702 and a runtime portion 704. Although the steps of setup portion 702 are described below as occurring before the steps of runtime portion 704; in some implementations of method 700, all or a portion of the steps of setup portion 702 are not necessarily performed before beginning performance of the steps of runtime portion 704, but may instead be interspersed with the steps of runtime portion 704. For applications in which method 700 is performed in combination with the secure zone techniques described hereinabove:

the steps of setup portion 702 may be performed as part of setup portion 104 of method 100, described hereinabove with reference to FIG. 2, and/or as part of setup step 601 of method 600, described hereinabove with reference to FIG. 8; and/or the steps of runtime portion 704 may be performed as part of web content presentation step 124 of method 100, described hereinabove with reference to FIG. 2, and/or as part of web content presentation step 612 of method 600, described hereinabove with reference to FIG. 8

Setup portion 702 begins at a seal media object division step 706, in which seal media object 154 (which typically comprises a still or moving image) is divided into a plurality of image elements. Each of the elements typically comprises a layer of the seal media object and/or an image (still or moving) portion of the seal media object. For some applications, at least two of the elements of the seal media object are respective image (still or moving) portions of the seal media object. Alternatively or additionally, at least two of the elements of the seal media object are respective layers of the seal media object. Further alternatively, the seal media object is divided into both layers and image (still or moving) portions. Optionally, the image portions are also divided into layers. Optionally, one or more of the image elements (layers, still images, and/or moving images) may include audio, other none-image content, or control elements (e.g., buttons, checkboxes, menus, and/or login controls (such as described hereinabove with reference to FIG. 5>>; thus, the term "image element," as used in the present application, including in the claims, includes within its scope image elements that optionally include audio, control elements, or other non-image content. As used in the present application, including in the claims, a "moving image" is an image that comprises a sequence of images displayed over time, such as an animated image (e.g., an animated gif), or a video image (e.g., an MPEG video or a Flash video); the moving image optionally additionally includes audio. Typically, the image elements are stored in respective files (i.e., each image element is stored in a separate file).

Typically, the files of the image elements of the seal media object are saved using arbitrary file names, which do not provide any indication that the files are related to the seal image. As a result, if the files of the image elements are downloaded to a cache (such as in Windows® operating systems), or otherwise saved to the user's computer, the user cannot easily identify that the files are related to the seal image. Even if the user succeeds in identifying the relevant image files, how to assemble the elements to create the complete seal image will not be readily apparent to the user, because the file names do not provide information regarding the positional relationship of the elements with one another in the complete seal image. Furthermore, it is difficult for the user to save all of the individual elements of the seal. If the seal includes a plurality of image portions, clicking on the seal by the user selects only the single image portion at the cursor, rather than all of the image portions of the seal. Only this selected image portion of the seal is saved by the computer, rather than all of the image portions. In addition, if the seal includes a plurality of layers, clicking on the seal selects only the top layer, and only this top layer of the seal is saved by the computer, rather than all of the layers.

For some applications, the seal media object is divided into a large number of elements (e.g., more than 10 elements, such as more than 20, 30, 50, or 100 elements), such that in practice it is nearly impossible for the user to reconstruct the seal from the elements. The images of the elements are quite small, making it difficult for the user to identify that the image files are related to the seal image, even if the user were to view the image files. For some applications, each image element includes only a single pixel, or a small number of pixels, such as no more than 16 pixels (e.g., no more than 9 pixels), for example, 4, 6, 9, 12, or 16 pixels For some applications, the top layer of the seal media object is a transparent layer. If the user of the browser attempts to drag and drop the seal (e.g., onto the desktop of the user's computer), only this top transparent layer is saved to user's computer. The user cannot drag and drop the rest of the layers and/or image portions of the seal image. The user is thus unable to save a meaningful copy of the seal image, for possible unauthorized display on a web page. For some applications, the top transparent layer is entirely transparent. For other applications; the top transparent is partially transparent, and includes one or more non-transparent portions.

Reference is still made to FIG. 9. At an element storage step 708, the elements (layers and/or image portions) are saved at respective network (e.g., web) locations (typically URLs and/or IP addresses). The network locations (e.g., URLs) are stored in a data repository, such as data repository 121, described hereinabove with reference to FIGS. 1 and 3. At an HTML element generation step 710, central services server 20 generates an HTML element (typically an <img> element) for each image element (layer or image portion) of the seal media object. The web content that represents seal media object 154 comprises these HTML elements. (For applications in which method 700 is performed in combination with the secure zone techniques described hereinabove, this web content is later delivered to inline frame 116 (which serves as a secure zone), shown in FIG. 1, or secure zones 504, shown in FIG. 7.) Each HTML element includes a specific identifier, which identifies which image element (layer or portion) of the seal image is associated with the HTML element.

The following exemplary HTML code snippet includes HTML elements corresponding to five layers of seal media object 154, with identifiers ImgTpseal0, ImgTpseal1, ImgTpseal2, ImgTpseal3, and ImgTpseal4, respectively. The HTML elements also specify the stack order of the elements (z-index), as is known in the HTML art. These HTML code elements are placed on the web content page in predetermined locations, such that the HTML code that includes these HTML code elements specifies positions on the web page of the image elements with respect to one another, thereby causing the browser to properly assemble the image elements as the seal media object. (Layers are placed at the same location in the web content page, on top of one another, while portions of the image are placed at different locations on the web content page.) The number of layers is also predetermined (in this example, five). For applications in which method 700 is performed in combination with the secure zone techniques described hereinabove, the source code of the secure zone (e.g., the IFrame) is not accessible to the user of the browser.

LISTING 4

```
<img class="x" id="ImgTpseal0" border="0" runat="server" style="backgroundcolor:
transparent;position:absolute; left: 0px; top: 0px;z-index:0; "/>
<img class="x" id="ImgTpseal1" border="0" runat="server" style="backgroundcolor:
transparent;position:absolute; left: 0px; top: 0px;z-index: 1; "/>
<img class='x' id='OmgTpsea2" border="O" runat="server" style="backgroundcolor:
transparent;position:absolute; left: Opx; top: 0px;z-index:2;"/>
<img class="x" id=ImgTpseald3' border="0" runat="server" style="background- color:
transparent;position:absolute; left: 0px; top: 0px;z-index:3;"/>
<img class='x' id="ImgTpseal4" border="0" runat="server" style="background-
color:transparent;position:absolute; left: 0px; top: 0px;z-index:4;"/>
```

Reference is still made to FIG. 9. Runtime portion 704 of method 700 is executed after the web page (such as described hereinabove with reference to FIGS. 1-3), or a portion the web page (e.g., an entity associated with the seal, such as described hereinabove with reference to FIGS. 7-8), has been authenticated. For example, central services server 20 may perform such authentication by, upon opening of the web page in a browser, receiving a referred address associated with the web page; comparing the referrer address with a stored URL; and authenticating the web page upon finding a match between the referrer address and the stored web page URL.

After authentication, central services server 20 retrieves the URLs of the elements of seal media object 154 from the data repository, and saves the URLs in a data structure, such as in respective array elements of an array, at a retrieval and array storage step 712 of runtime portion 704. For some applications, step 712 is omitted.

The following exemplary C# code snippet illustrates one possible implementation of retrieval and array storage step 712:

```
                              LISTING 5
<Ascertain whether the domain is eligible for a seal>
Domain = GnFunctions. C1earHttpOrHttpsFromDomain(Domain);
DataSet DS = TcssBL.GetTpSealbyDomain(Domain,FullDir);
<If the domain is eligible for a seal, retrieve the web location (e.g., URL) of the images
that comprise the seal (e.g., the layers), and of the images that comprise the mouse-over
view of the seal and put them in corresponding arrays. The locations of the seals are
stored in a data repository, e.g., a database, in a string, in which the image locations are
separated by a ';'>
if (DS.Tables[0].Rows.Count > 0)
    {
string SealLocation ˉ DS .Tables[0] .Rows[0] ["TpSeal_Location"] .ToString( )
string[ ] SealLocations = SealLocation.Split(';')
string SealOverLocation =
    DS.Tables[O].Rows[O] ["TpSeal_Over_Location"].ToString( );
    string[ ] SealOverLocations = SealOverl.ocation.Split(';')
      Int32 Result = 1;
      while (Result == 1)
      {
          SealKey ˉ SealKeyType + CreateRandomKey( );
          Result ˉ TcssBL.CheckIfSealKeyExists_BL
          (Rep.GetTextFromArrayByType("Sec", "DbName"), SealKey);
      }
TcssBL.InsertSealKeyForClienCBL(Rep.GetTextFromArrayByType("Sec";
"DhName"), Rep.GetTextFromArrayByType("Log", "DbbIame"), Domain, FullDir,
Convert.ToInt32(DS.Tables[0].Rows[0]["Tpn"].ToString( )), SealKey,Ip);
ATpSeal.Attributes.Add("onmouseover", "this.style.cursor = 'pointer';");
HtmlImage Img;
```

At an image source update step 714, for each HTML element of the web content, central services server 20 changes the source of the image to the web location (e.g., URL) of the corresponding element saved in the array, using the identifiers specified by the HTML elements (e.g., ImgTpseal0, ImgTpseal1, etc.). It is noted that the user of the browser cannot view these updated web locations in the HTML code downloaded to the browser, because these updates are performed only at the server.

The following exemplary C# code snippet illustrates one possible implementation of image source update step 714:

```
                              LISTING 6
<For each possible layer (in this case there are 5 layers), select the relevant image from
the HTML code of the web page (e.g., contained in the Secure Zone IFrame), and
change the image's source to the corresponding seal layer web location retrieved earlier>
for (int i = 0; i <= SealLocations.Length-1; i++)
{
      <If the current array element contains a web location of a seal layer image,
      connect it to the corresponding HTML image>
      if (!String.IsNullOrEmpty(SealLocations[i].ToString( )))
{
<Select the relevant image from the HTML code>
Img = (HtmlImage)this.FindControl("ImgTpseal" + i);
<Change the images' source to the corresponding web location>
Img.Src = SealLocations[i].ToString( );
}
<If the current array element does not contain a web location of a seal layer image, make
the corresponding HTML image invisible>
else
{
Img = (HtmlImage)this.FindControl("ImgTpseal" + i);
Img.Visible = false;
}
if (i == SealLocations.Length-1)
{
<Do the same for the mouse over seal image>
Img.Attributes.Add("onmouseover", "this.src=' " + SealOverLocations[i].ToString( ) +
"'");
<Do the same for the mouse out seal image>
Img.Attributes.Add("onmouseout", "this.src=' " + SealLocations[i] .ToString( ) +"'");
}
}
for (int i = SealLocations.Length; i <= 4; i++)
```

LISTING 6

```
{
Img = (HtmlImage)this.FindControl("ImgTpseal" + i);
Img.Visible = false;
}
```

At a display step 716, central services server 20 delivers the elements of the seal media object for reassembly and display by the browser on the web page as the original seal media object, e.g., to or via inline frame 116 (which serves as a secure zone) or one of secure zones 504, using the updated image sources. HTML elements of the web content cause the browser to reassemble the elements and construct the seal image on the fly.

Figure 10:
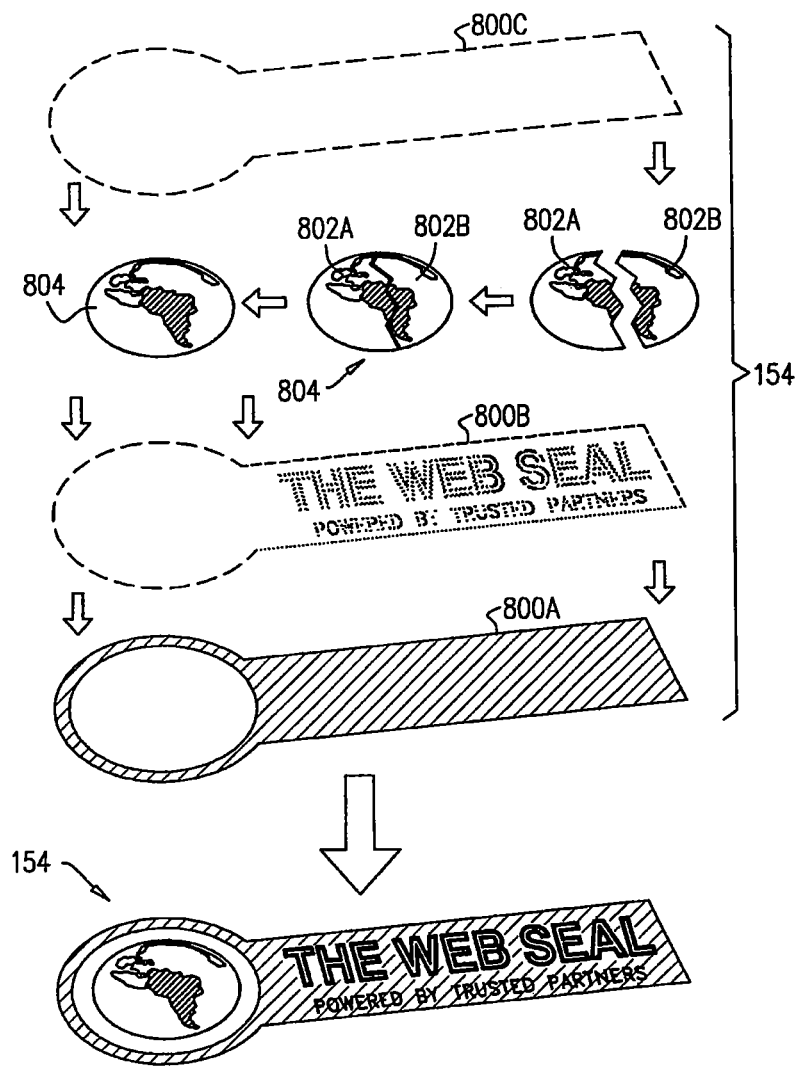
FIG. 10 is a schematic illustration of the assembly of an exemplary seal media object, in accordance with an application of the present disclosure.

Reference is made to FIG. 10, which is a schematic illustration of the assembly of an exemplary seal media object 154, in accordance with an application of the present disclosure. The seal media object has been divided into layers and image portions, such as using the techniques described hereinabove with reference to FIG. 9. In this example, seal media object 154 has been divided into three layers (a first layer 800A, a second layer 800B, and a third layer 800C), and two image portions (a first image portion 802A and a second image portion 802B).

These elements of the seal media object (layers and image portions) are appropriately placed on the web content page that displays seal media object 154, such that when the browser downloads the elements and displays the elements as prescribed by the HTML elements, the elements are reassembled to produce thy original seal media object 154. In this example, first and second image portions 802A and 802B are assembled to produce a combined image 804, which is positioned at a location on the web content page that is transparent in all three of layers 800A, 800B, and 800C. Top layer 800C is entirely transparent. The layers are stacked and combined with image 804 to produce the combined, original seal media object, as shown in FIG. 10. It will be appreciated by persons skilled in the art that the present disclosure is not limited to what has been particularly shown and described hereinabove. Rather, the scope of the present disclosure includes both combinations and sub-combinations of the various features described hereinabove, as well as variations and modifications thereof that are not in the prior art, which would occur to persons skilled in the art upon reading the foregoing description.

The terms "comprises" or "comprising" are to be interpreted as specifying the presence of the stated features, integers, steps or components, but not precluding the presence of one or more other features, integers, steps or components or groups thereof.

What is claimed is:

1. A method comprising:
    storing a plurality of image elements of a seal media object in respective files in an authentication server system, wherein each of the image elements is selected from the group consisting of: a layer of the seal media object, a still image portion of the seal media object, and a moving image portion of the seal media object;
    authenticating, by the authentication server system, at least a portion of a web page, upon an opening of the web page in a browser, wherein the authenticating comprises:
        storing a web page URL identifying the web page in the authentication server system;
        receiving, by the authentication server system, upon the opening of the web page in the browser, a referrer address associated with the web page;
        comparing, by the authentication server system, the referrer address with the stored URL; and
        providing authentication, upon a match between the referrer address and the stored web page URL; and
    delivering to the browser, by the authentication server system, files for assembly and display of the image elements on the web page as the seal media object upon authenticating.

2. The method according to claim 1, wherein each of at least two of the image elements of the seal media object is selected from the group consisting of: the still image portion of the seal media object, and the moving image portion of the seal media object.

3. The method according to claim 1, wherein at least two of the image elements of the seal media object are respective layers of the seal media object.

4. The method according to claim 1, wherein the delivering comprises delivering a plurality of HTML elements specifying the image elements of the seal media object, respectively.

5. The method according to claim 4,
    wherein the delivering further comprises delivering HTML code,
    wherein the HTML code comprises the HTML elements, and
    wherein the HTML code specifies positions on the web page of the image elements with respect to one another.

6. The method according to claim 1, wherein the storing of the plurality of image elements comprises storing the image elements at respective network locations, and saving the network locations.

7. The method according to claim 1, wherein the storing of the plurality of image elements comprises storing the files at respective network locations.

8. The method according to claim 1, wherein the delivering comprises:
    providing a browser-side script to be placed on the web page;
    triggering execution of a server-side script at the authentication server system, upon the opening of the web page in the browser;
    creating a secure zone on the web page, by the server-side script, wherein the secure zone is controlled by the authentication server system during a session associated with the secure zone;
    retrieving, by the authentication server system, the referrer address from the session; and
    delivering, by the authentication server system, the files to or via the secure zone.

9. The method according to claim 8,
    wherein the secure zone includes a HTML IFrame, and
    wherein creating the secure zone comprises creating the HTML IFrame on the web page.

10. The method according to claim 1, wherein the authenticating also comprises:

storing a plurality of unique identification codes assigned to respective entities in the authentication server system;

providing a plurality of HTML code elements to be placed on the web page in association with respective identifiers of the entities, wherein each one of the plurality of HTML code elements specify at least one of the plurality of unique identification codes via the respective identifiers of the entities, respectively, and wherein the HTML code elements specify creation of at least one secure zone on the web page;

executing a server-side program at the authentication server system upon the opening of the web page in the browser, wherein the server-side program receives the unique identification codes specified by the HTML code elements;

authenticating the received unique identification codes via a comparison between the received unique identification codes and the unique identification codes stored in the authentication server system; and providing valid authentication upon finding one or more matches between one of the received unique identification codes and one of the stored unique identification codes, wherein the delivering comprises delivering, by the authentication server system, the files to or via the secure zone.

11. An apparatus comprising:

an interface for communicating with a browser over a network;

a memory that stores a plurality of image elements of a seal media object in respective files, wherein each of the image elements is selected from the group consisting of: a layer of the seal media object, a still image portion of the seal media object, and a moving image portion of the seal media object; and a processor, that executes program instructions that cause the processor to:

authenticate at least a portion of a web page upon opening of the web page in the browser, wherein to authenticate, the instructions cause the processor to:

store in the memory, a web page URL that identifies the web page;

receive a referrer address associated with the web page, upon the opening of the web page in the browser;

compare the referrer address with the stored URL; and provide valid authentication, upon finding a match between the referrer address and the stored web page URL; and deliver the files for assembly and display of the image elements on the web page as the seal media object to the browser via the interface, upon authenticating.

12. The apparatus according to claim 11, wherein each of at least two of the image elements of the seal media object is selected from the group consisting of: the still image portion of the seal media object, and the moving image portion of the seal media object.

13. The apparatus according to claim 11, wherein at least two of the image elements of the seal media object are respective layers of the seal media object.

14. The apparatus according to claim 13, wherein one of the image elements is a transparent top layer.

15. The apparatus according to claim 11, wherein the instructions also cause the processor to deliver a plurality of HTML elements specifying the image elements of the seal media object, respectively.

16. The apparatus according to claim 15, wherein the instructions also cause the processor to deliver HTML code which includes the HTML elements, and wherein the HTML code specifies positions on the web page of the image elements with respect to one another.

17. The apparatus according to claim 11, wherein the memory is configured to store the image elements at respective network locations, and save the network locations.

18. The apparatus according to claim 11, wherein the memory is configured to store the files at respective network locations.

19. The apparatus according to claim 11, wherein the instructions also cause the processor to:

deliver the files by providing a browser-side script to be placed on the web page;

trigger execution of a server-side script by the browser-side script, upon the opening of the web page in the browser;

create a secure zone by the server-side script on the web page, wherein the secure zone is controlled by the processor during a session that is associated with the secure zone;

retrieve the referrer address from the session; and deliver the files to or via the secure zone.

20. The apparatus according to claim 19, wherein the secure zone includes an HTML IFrame.

21. The apparatus according to claim 11, wherein, when authenticating the portion of the web page, the instructions also cause the processor to:

store a plurality of unique identification codes assigned to respective entities;

provide a plurality of HTML code elements to be placed on the web page in association, wherein each one of the HTML code elements specify at least one of the plurality of unique identification codes, and wherein the HTML code elements specify creation of at least one secure zone on the web page;

execute a server-side program at the authentication server system upon the opening of the web page in the browser, wherein the server-side program receives the unique identification codes specified by the HTML code elements;

authenticate the received unique identification codes by a comparison between the received unique identification codes to the unique identification codes stored in the authentication server system; and provide valid authentication, upon one or more matches between one of the received unique identification codes and one of the stored unique identification codes, wherein the processor is configured to deliver the files to or via the secure zone associated with one or more of the received unique identification codes.

22. A non-transitory computer-readable medium comprising instructions, wherein the instructions, when read by processor, cause the processor to:

(a) store a plurality of image elements of a seal media object in respective files, wherein each of the image elements is selected from the group consisting of: a layer of the seal media object, a still image portion of the seal media object, and a moving image portion of the seal media object;

(b) authenticate at least a portion of a web page upon an opening of a web page in a browser; wherein to authenticate, the instructions cause the processor to:

store a web page URL identifying the web page;

receive a referrer address associated with the web page upon the opening of the web page in the browser;

compare the referrer address with the stored URL; and find the web page to be authentic responsively to finding a match between the referrer address and the stored web page URL; and (c) deliver to the browser the files for assembly and display of the image elements on the web page as the seal media object upon authenticating.

23. The non-transitory computer-readable medium according to claim 22, wherein each of at least two of the image elements of the seal media object is selected from the group consisting of: the still image portion of the seal media object, and the moving image portion of the seal media object.

24. The non-transitory computer-readable medium according to claim 22, wherein at least two of the image elements of the seal media object are respective layers of the seal media object.

25. The non-transitory computer-readable medium according to claim 24, wherein one of the image elements is a transparent top layer.

26. The non-transitory computer-readable medium according to claim 22, wherein the instructions also cause the computer to deliver a plurality of HTML elements specifying the image elements of the seal media object, respectively.

27. The non-transitory computer-readable medium according to claim 26,
wherein the instructions also cause the processor to deliver HTML code,
wherein the HTML code includes the HTML elements, and
wherein the HTML elements specify positions on the web page of the image elements with respect to one another.

28. The non-transitory computer-readable medium according to claim 22, wherein the instructions, also cause the processor to store the image elements at respective network locations, and save the network locations.

29. The non-transitory computer-readable medium according to claim 22, wherein the instructions, also cause the processor to store the files at respective network locations.

30. The non-transitory computer-readable medium according to claim 22, wherein the instructions also cause the processor to:
deliver the files by providing a browser-side script to be placed on the web page;
trigger, upon the opening of the web page in the browser, by the browser-side script, execution of a server-side script;
create on the web page, by the server-side script, a secure zone that is controlled by the processor during a session that is associated with the secure zone;
retrieve the referrer address from the session; and
deliver the files to or via the secure zone.

31. The non-transitory computer-readable medium according to claim 30, wherein the secure zone includes an HTML IFrame.

32. The non-transitory computer-readable medium according to claim 22, wherein to authenticate at least a portion of the web page, the instructions also cause the processor to:
store a plurality of unique identification codes assigned to respective entities;
provide a plurality of HTML code elements to be placed on the web page in association with respective identifiers of the entities, wherein the HTML code elements specifying respective ones of the unique identification codes for the respective associated identifiers of the entities, and wherein the HTML code elements specify creation of at least one secure zone on the web page;
trigger execution of a server-side program at the authentication server system upon the opening of the web page in a browser;
receive the unique identification codes specified by the code elements, compares the received unique identification codes to the unique identification codes stored in the authentication server system;
find the portion of the web page to be authentic responsively to finding one or more matches between one of the received unique identification codes and one of the stored unique identification codes; and
deliver the files to or via the secure zone associated with one or more of the received unique identification codes.

\* \* \* \* \*